Sept. 14, 1926.  1,599,912
R. NAUJOKS
ELECTRIC COOKING DEVICE
Filed April 4, 1924   2 Sheets-Sheet 2
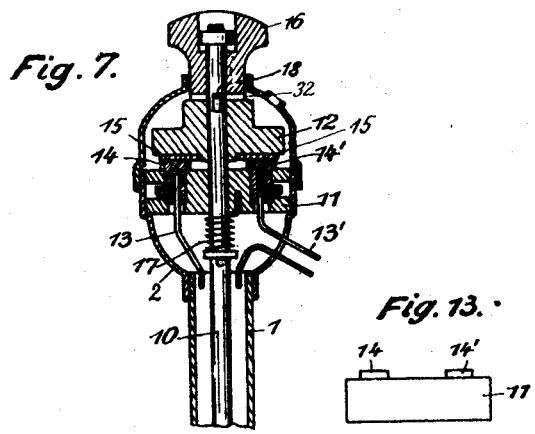
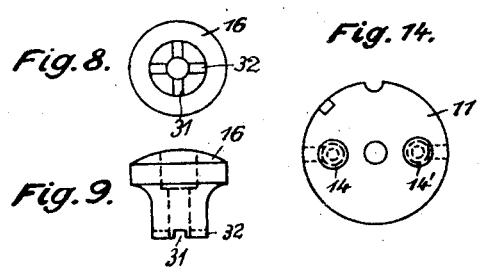
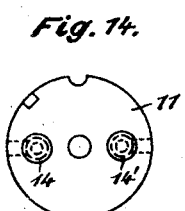
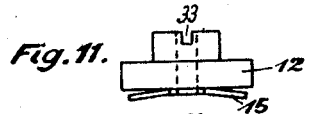
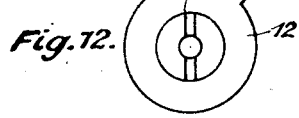
Inventor:
Rudolf Naujoks
by [signature]
attorney.

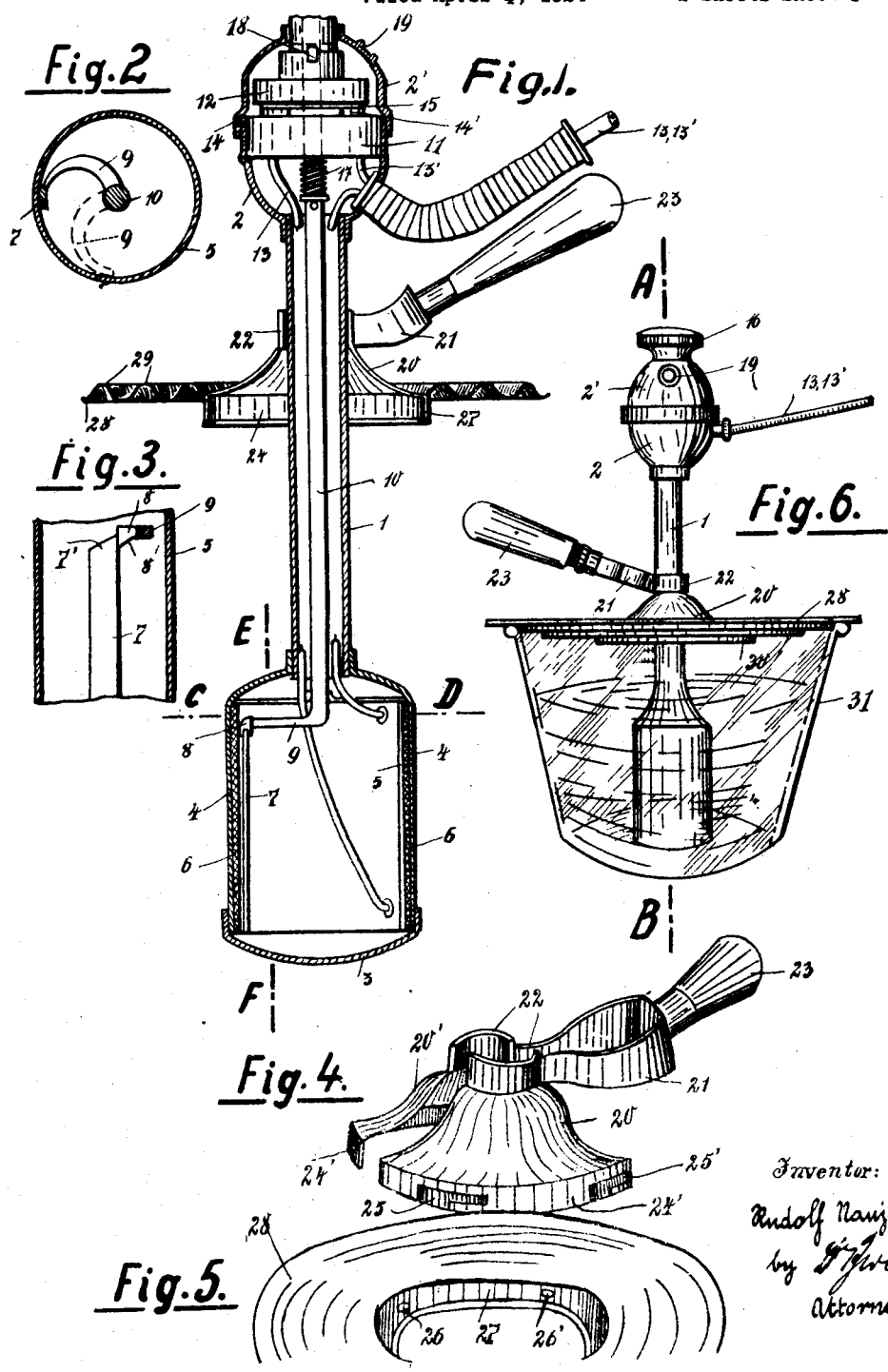

Patented Sept. 14, 1926.

1,599,912

UNITED STATES PATENT OFFICE.

RUDOLF NAUJOKS, OF BERLIN-FRIEDENAU, GERMANY.

ELECTRIC COOKING DEVICE.

Application filed April 4, 1924, Serial No. 704,209, and in Germany April 4, 1923.

My invention relates to an electric cooking device for use in connection with pots or other suitable receptacles for liquid or other food to be heated or cooked; more especially it relates to an electric cooking device in which the heater proper is to be immersed or plunged into the respective liquid or other food, and is combined with a lid for the respective receptacle and provided with an automatic cut-out for the heating current, as is more fully described hereinafter.

I am aware of the fact that there exist already electric heating and cooking devices having an electric element or unit which is to be immersed or plunged into the respective food, but as such devices must be light and handy their mass is only slight, in consequence whereof also their heat-capacity is correspondingly limited and there is a danger that the heating body becomes superheated and fuses if its temperature is not kept down on a certain harmless limit by the food to be heated or cooked.

The above-mentioned drawback has, up to now, prevented the general use of the electric immersion or plunging cooking devices in spite of their low buying costs and the small consumption of current, and endeavours have already been made to provide the devices of this kind with means for cutting-out the current automatically if a certain temperature is reached. This has been effected, f. i., with the aid of an overpressure arising in the device when a certain temperature has been reached. It has, however, been found that these automatic current-breaking devices do not operate reliably, and the object of my invention is to overcome this drawback.

I attain this object with the aid of a quick-break switch encased in the upper part of the heating device, this switch being actuated, i. e. released, when a certain admissible maximal temperature is being surpassed by means of a member arranged in the plunger and being sensitive to heat. This member which is described hereinafter is preferably secured directly to the plunger in such a manner that it, while moving inwards from the hottest part of the plunger, releases the quick-break switch when the predetermined maximum temperature has been reached or is just being surpassed. The heat-sensitive member operating in the predescribed manner consists of a bimetallic bar or strap composed, for instance, of copper and iron. The shape of this bar or strap changes when the temperature changes and when the temperature rises and attains a certain height the shape of said bimetallic bar or strap is such that the quick-break switch is so actuated that it returns suddenly into its current-break position.

The head containing the said quick-break switch lies outside the food and said head and the plunger containing the electric heating member proper are connected with each other by a tube which is encompassed by a shiftable bipartite lid-like member serving as carrier for an annulus forming with said lid-like member a lid proper for the pot or other receptacle containing the food to be heated or cooked. The diameter of the central opening of the annulus is such that the plunger can be passed through it down into the respective pot or other receptacle whereafter the said bipartite member is inserted into said central opening and coupled with the annulus by a bayonet-closure or any other connecting means permitting an easy disconnection of these two parts. The bipartite central member of the lid is provided with a handle, and the entire heating or cooking device can be lifted out of the pot etc. by means of this handle when the bipartite central lid-part has been disconnected from the annular other or outer part of the lid. The lid fits upon pots etc. of various diameters in that it is provided with a plurality of concentric grooves or steps, as is also more fully described hereinafter and shown in the drawing.

My invention is illustrated by way of example in the accompanying drawing in which Figure 1 is a vertical longitudinal section through the complete device, the plane of section being the plane A—B of Figure 6; Figure 2 is a horizontal section of the heating plunger in the plane C—D of Figure 1; Figure 3 is a vertical section of said plunger in the plane E—F of Figure 1, the top-part and the bottom-part being broken away; Figures 4 and 5 are perspective illustrations of the two parts forming the lid for the respective pot or other receptacle, Figure 4 showing the bipartite central part and Figure 5 the annulus, as mentioned in the preamble. Figure 6 is a side-view of the entire device placed upon a pot which is shown as if it were transparent in order to show the plunger in its proper working position within the pot; this figure is drawn on a reduced scale. In the Figures 7–14 details of the thermostatic break switch are shown namely Figure 7 is a vertical longitudinal section through the switch, Figures 8 and 9 are a below and side view of the knob 16, Figures 10, 11, 12 are a below, side and upper view of the rotary part 12 of the switch, Figures 13 and 14 showing side and upper views of the stationary part 11 of the switch.

In Fig. 1, 1 is the tubular shaft of the device, to the top of which is attached a bipartite casing consisting of a lower part 2 and of an upper part 2′, and to the lower end of which is secured the electric heating member or plunger 4 which is closed at its lower end by a bottom 3. Within this plunger is a cylinder 5 around which is wound the insulated heating wire 6, and to the inner surface of the cylinder 5 is affixed a vertical bar or strap 7 which is connected at its lower end with said cylinder whereas its upper end can move inwardly. The bar or strap is bimetallic and its upper end is oblique, as shown at 7′, Fig. 3. This end co-operates with a lug 8 having an oblique surface 8′ at its lower side (Fig. 3) and being secured to the end of a curved arm 9 forming the lower end of a vertical shaft 10 extending upwards through the tube 1 into the top casing 2, 2′, wherein the quick-break switch 11/12 is housed.

This switch consists of a stationary part 11 firmly connected with the casing-part 2, and of a rotary part 12, each being provided with the necessary contacts, of which 14 and 14′ are those of the switch member 11; they are connected with the ends of the heating wire 6 (in the plunger 4) by wires 13 and 13′, of which only the upper ends are shown in Fig. 1. 15 is a contact member attached to the rotary switch part 12.

Attached to the upper end of the vertical shaft 10 is a movable knob 16 which may be arranged rotary on the shaft and, perhaps, axially movable, too. Below the stationary switch part 11 a spiral spring 17 encompasses the adjacent part of the shaft 10. This spring is secured at its lower end to this shaft and at its upper end to the switch part 11, and its tension is such that it tends to move the shaft axially downwards. Above the switch 11/12 a projection 18 extends laterally forth from the shaft. This projection co-operates with one or the other part of cross-shaped grooves 31 and 32 provided in the bottom-surface of the knob 16, and it engages also a groove 33 provided in the top-surface of the rotary switch part 12, so that this part can be turned by means of the knob by the intermediary of said projection 18, the shaft 10 partaking in the rotation. An inspection hole 19 provided in the upper part 2′ of the switch-casing, permits to observe the projection 18, or to ascertain its position respectively, whereby the ascertainment is rendered possible whether the electric heating body is switched on or off.

The lid for the pot or other receptacle containing the liquid or other food to be cooked consists of a bipartite central member 20, 20′ Figs. 1 and 4, and of an annular outer member 28, Figs. 1 and 5 having a large central opening into which said member 20, 20′ fits (Figs. 1 and 6). In the form of construction shown by way of example the central lid part is bell-shaped and its top members 22 form a clip which can be closed loosely around the tube 1 (Figs. 1 and 6). The clip members 22 are rigidly connected with an elastic bow 21 provided with a handle 23 by which the entire device can be lifted out of, and off, the top or other receptacle.

The vertical lower rims 24′ of the central lid part 20, 20 are provided with angular slits or impressed cavities 25, 25′ (Fig. 4) serving as bayonet closures together with inner projections 26, 26′ (Fig. 5) of the annulus 28. I wish it, however, to be understood that this connecting means for the lid parts is merely an example. These latter being connected with each other by another suitable means, for instance by screwthreads, a necessity being, however, that the connection and disconnection of the lid-parts can be effected easily. The annulus 28 may be practically flat or horizontal, or convex or concave and it may be provided with concentric grooves or undulations 29, as in Fig. 1, or with concentric grooves or steps 30, as in Fig. 6, the purpose in either case being to render the lid fit for various pots etc. having different diameters.

The manner of operation of the device is as follows:

When the heating body is switched off, the arm 9 is in the position indicated by dotted lines in Fig. 2. In order to switch it on, the button 16, the groove 31 of which is engaging projection 18 is turned in clockwise direction whereby the spring 17 is subjected to torsional stress, the shaft 10 is turned, and the arm 9 is turned so that its lug 8 arrives over the bimetallic bar or strap 7, the oblique surface 8′ of the lug contacting them with the oblique surface 7′ of said bar or segment and gliding along upwards on it, the shaft 10 being correspondingly lifted so that the button 16, projection 18 releasing groove 31, is turned over the part 12 till projection 18 engages groove 32 and the spring 17 being correspondingly compressed. At the end of this path the lug 8 drops behind the top end of the bar 7 whereby the arm 9 is checked, as are also the parts connected with it. By the rotation of the shaft 10 also the switch part 12 has been rotated in such a direction that the electric heating body is switched on which can be ascertained through the inspection hole 19 by ascertaining the position of the projection 18, as already described.

When a certain predetermined temperature has been reached, or is being surpassed respectively, the bimetallic bar or strap 7 commences to bend inwardly whereby the lug 8 is released, as are, of course also the arm 9, the shaft 10, the spring 17, and the rotary switch part 12, so that the circuit is broken and the movable parts mentioned return into their initial position. When then the heating body cools down, the strap 7 reassumes its original straight shape or vertical position and the device is then ready for being again switched on. The breadth of the oblique surfaces 7' and 8' is such that the disconnection takes place only at a certain predetermined temperature, and means may be provided to adjust the parts in question to another temperature, if desired or required.

The circuit can be broken also manually by lifting the knob 16 so as to lift it off the projection 18 whereafter the torsional tension of the spring 17 effects the rotation of the rotary part of the switch, as already described. Of course, also a separate switch may be provided for breaking the current independent of the automatic means described. The switch may be a regulating switch for use in connection with several temperatures, and the electric heating body may form a hollow cylinder instead of a practically solid one, or may be annular or flat etc.

It appears from Figures 4 and 5 that the lid can be easily disconnected from the tube 1, as its central part 20 20' need simply be turned a little so as to disconnect the coupling members 25/26 and 25' 26' whereafter the central part can be lifted and withdrawn from the annular part, when the former will spread as in Figure 4, the bow 21 being appropriately elastic. And as the annulus is provided preferably either with concentric undulations (29, Fig. 1) or steps (30, Fig. 6), the complete lid fits upon pots etc. of different diameters and the heating device will in any case be held in the centre of the respective pot etc. The clip 22 does not embrace the tube 1 tightly but the complete lid is shiftable along said tube so that the lid can be lifted off the pot etc. in order to inspect its contents without lifting the heating body out of the latter, but when the clip has arrived in its uppermost position, at the switch casing part 2, now also the heating device can be removed from the pot etc. by means of the handle 23 to which the clip 22 is attached.

I claim:

1. An electric cooking device adapted to be inserted into a food-containing receptacle comprising, in combination, an electric heating body to be plunged into the food, a hollow member, to the lower end of which said body is attached and through which the conducting wires extend; a quick break switch on the top of said hollow member; a heat-sensitive member arranged within the heating body; and means controlled by said heat-sensitive member and adapted to switch the said switch off when the heat-sensitive member undergoes the influence of a certain temperature, substantially as set forth.

2. An electric cooking device adapted to be inserted into a food-containing receptacle, comprising, in combination, an electric heating body adapted to be plunged into the food, a tube, to the lower end of which said body is attached and through which the conducting wires extend; a quick break switch on the top of said tube; a bimetallic bar located within the said heating body a shaft extending through said tube and being at its upper end connected with the movable part of the switch said shaft being controlled by said bimetallic bar and adapted to switch the said switch off when the bimetallic bar undergoes the influence of a certain temperature, substantially as set forth.

3. An electric cooking device adapted to be inserted into a food-containing receptacle comprising, in combination, an electric heating body adapted to be plunged into the food, a hollow member, to the lower end of which said body is attached and through which the conducting wires extend; a quick break swith on the top of said hollow member lying outside the food; a heat-sensitive member arranged within the heating body; and means controlled by said heat-sensitive member and adapted to switch the said switch off when the heat-sensitive member undergoes the influence of a certain temperature, substantially as set forth.

4. An electric cooking device adapted to be inserted into a food-containing receptacle, comprising, in combination, an electric heating body adapted to be plunged into the food, a hollow member, to the lower end of which said body is attached and through which the conducting wires extend; a quick break switch on the top of said member lying outside the food; a heat-sensitive member arranged within the heating body; means controlled by said heat-sensitive member and adapted to switch the said switch off when the heat-sensitive member undergoes the influence of a certain temperature; and a lid consisting of an annulus having a central opening and of a central part adapted to be shifted along the said hollow member, to be inserted into the central opening of the annulus, and to be coupled therewith, substantially as set forth.

5. An electric cooking device adapted to be inserted into a food-containing receptacle, comprising in combination, an electric heating body adapted to be plunged into the food, a hollow member, to the lower end of which said body is attached and through which the conducting wires extend; a quick break switch on the top of said member lying outside the food; a heat-sensitive member arranged within the heating body means controlled by said heat-sensitive member and adapted to switch the said switch off when the heat-sensitive member undergoes the influence of a certain temperature; a lid consisting of an annulus having a central opening, of a central part adapted to be shifted along the said hollow vertical member and to be inserted into the central opening of said annulus, and of bayonet-closures forming parts of said two lid parts and adapted to connect them with each other, substantially as set forth.

6. An electric cooking device adapted to be inserted into a food-containing receptacle, comprising, an electric heating body adapted to be plunged into the food, a hollow member, to the lower end of which said body is attached and through which the conducting wires extend; a quick break switch on the top of said member; a heat-sensitive member arranged within the heating body; means controlled by said heat-sensitive member and adapted to switch said switch off when the heat-sensitive member undergoes the influence of a certain temperature; a lid consisting of an annulus provided with concentric grooves, and of a central part adapted to be shifted along the said hollow member, to be inserted into the central opening of the annulus, and to be coupled therewith, substantially as set forth.

In testimony whereof I have signed my name to this specification.

RUDOLF NAUJOKS.